United States Patent [19]

Wald

[11] 4,257,791

[45] * Mar. 24, 1981

[54] FILTER

[75] Inventor: Stephen A. Wald, Winston-Salem, N.C.

[73] Assignee: Lydall, Inc., Manchester, Conn.

[*] Notice: The portion of the term of this patent subsequent to Aug. 14, 1996, has been disclaimed.

[21] Appl. No.: 65,529

[22] Filed: Aug. 10, 1979

Related U.S. Application Data

[62] Division of Ser. No. 752,884, Dec. 21, 1976, Pat. No. 4,164,400.

[51] Int. Cl.$^3$ .............................................. B01D 46/00
[52] U.S. Cl. ......................................... 55/382; 55/291; 55/302; 55/473; 55/487; 55/498; 55/524; 55/528
[58] Field of Search ................. 55/382, 291, 302, 473, 55/487, 486, 498, 524, 527, 528; 210/508, 509; 428/218, 219, 305, 234, 235, 300

[56] References Cited

U.S. PATENT DOCUMENTS

| | | | |
|---|---|---|---|
| 1,530,674 | 3/1925 | Jackson | 55/382 |
| 2,138,874 | 12/1938 | Myers | 55/527 |
| 2,933,154 | 4/1960 | Lauterbach | 55/486 |
| 2,980,204 | 4/1961 | Jordan | 55/487 |
| 3,399,516 | 9/1968 | Hough, Jr. et al. | 55/498 |
| 3,483,679 | 12/1969 | Balbierer | 55/382 |
| 3,675,403 | 7/1972 | Ruffo | 55/524 |
| 4,093,437 | 6/1978 | Ichihara et al. | 55/528 |
| 4,100,323 | 7/1978 | Forsten | 55/528 |
| 4,164,400 | 8/1979 | Wald | 55/528 |

FOREIGN PATENT DOCUMENTS

| | | | |
|---|---|---|---|
| 1965358 | 9/1970 | Fed. Rep. of Germany | 55/524 |
| 2219801 | 9/1974 | France | 55/304 |

OTHER PUBLICATIONS

Dietrich–Dust Filtration with Needle Felts–Filtration and Separation, Jul.–Aug. 1972, pp. 438–443.

*Primary Examiner*—Bernard Nozick

[57] ABSTRACT

There is provided a filter wherein the filtering means has a non-woven needled textile filter fabric with an overall bulk density of at least 6 pounds per cubic foot and bulk density gradient such that the bulk density at the face surface of the fabric is greater than the bulk density at the back surface of the fabric. In conjunction with that bulk density gradient is a filtering gradient such that the fineness of filtration at the back face surface is greater than the fineness of filtration at the surface. The filter may be in any convenient form, such as the bag of an air conveyor filter or a vacuum cleaner filter.

27 Claims, 11 Drawing Figures

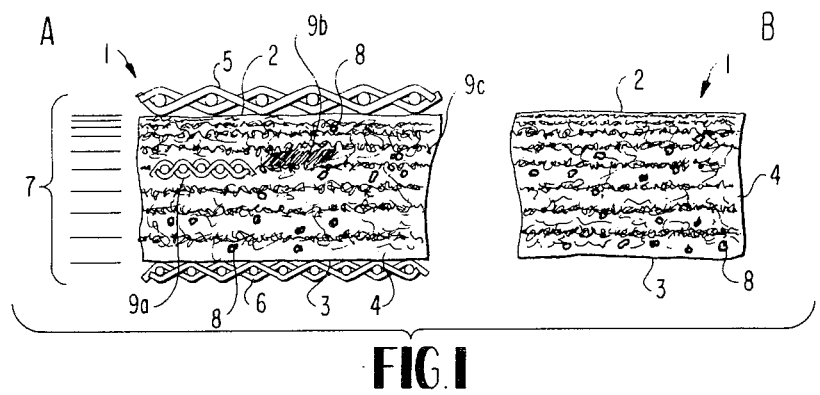
FIG.1
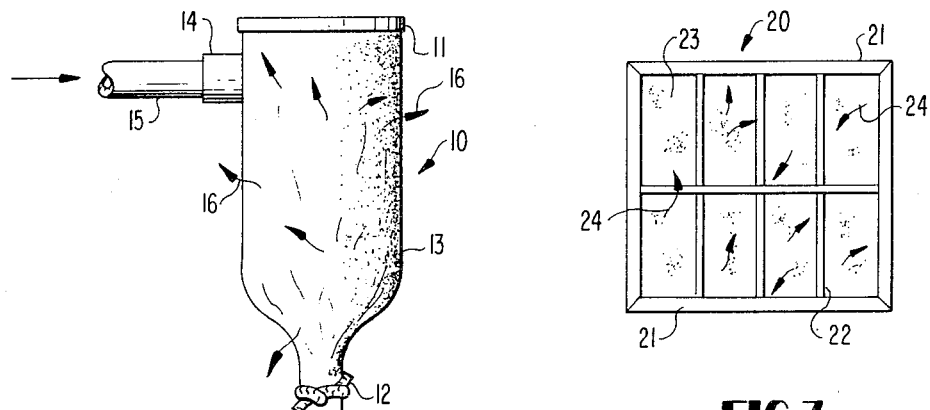
FIG.2
FIG.3
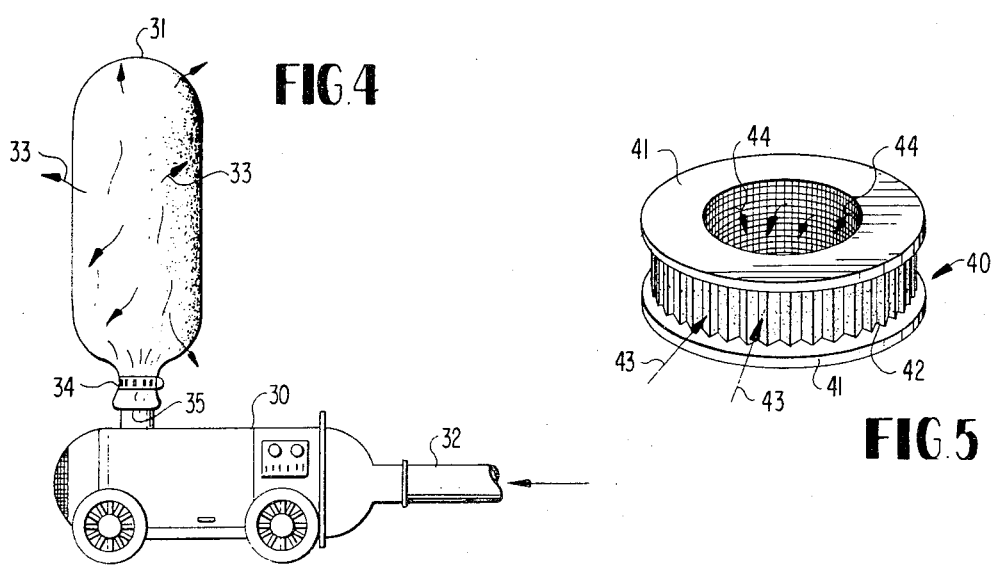
FIG.4
FIG.5

FILTER

This is a division of application Ser. No. 752,884 filed Dec. 21, 1976 now U.S. Pat. No. 4,164,400.

The present invention relates to filters, and more particularly to filters for separating solid particulate matter from a suspending gas, e.g. air. Even more particular, the present invention relates to such filters where the filtering means has a non-woven needled textile filter fabric with both a density gradient and a filtering gradient.

BACKGROUND OF THE INVENTION

Filters for separating solid particulate matter from a suspending gas find varied and wide application. These applications span such diverse uses as air conditioner filters, automobile air cleaners, air conveyor separator bags, vacuum cleaner bags, and the like. Filters of this nature use as the filtering means a fabric which is either a woven or a non-woven fabric. The woven fabric has the disadvantage (as opposed to the non-woven fabric) that it is relatively more expensive and the filtering efficiency (fineness of filtration at a given pressure drop) is lower. However, the woven fabric has the advantage of significantly greater tensile properties and may thus be used in more demanding applications, e.g. a "permanent" type filter. On the other hand, the non-woven fabric has the disadvantage (as opposed to the woven fabric) that the tensile properties are considerably less and, hence, the applications thereof are more limited. The non-woven fabric, however, has the advantages of lower cost and higher filtering efficiency.

For the foregoing reasons, filters have been generally divided into two groups, i.e., permanent filters and disposable filters. The woven fabrics have been generally used for the permanent filters, since these require the higher tensile characteristics, and the lower filtering efficiency is simply tolerated. The non-woven fabrics have been generally used for disposable filters, since these usually require the lower costs (with the higher filtering efficiency which further lowers cost) and the lower tensile characteristics are accepted for one-time (non-cleanable) use.

Examples of permanent filters using woven fabrics as the filtering element are air conveyor separator bags, industrial vacuum cleaner bags, and the like, while examples of disposable filters using non-woven fabrics as the filtering element are furnace filters, air conditioner filters, automobile engine filters and home vacuum cleaner bags. The non-woven fabrics most often used are not a textile fabric but a vitreous or cellulosic fabric such as spun glass (or slag) or paper.

The art has sought to overcome the difficulties of the non-woven fabrics by using special non-woven fabrics, referred to as needled textile fabrics. The needled fabrics are considerably improved in regard to the tensile properties, so as to allow the use of these fabrics in more demanding applications. However, the needling tends to increase the overall pressure drop while also tending to decrease the fineness of filtration—hence lowering the filtering efficiency. Further, in some applications the face surface of these needled fabrics tends to "blind" with repeated use. In other applications, leakage of the solids to be filtered through needle holes and poorly needled regions makes these fabrics unacceptable. Thus, needled fabrics as filtering fabrics have been commercially accepted in only special applications.

OBJECTS OF THE INVENTION

It is therefore an object of the invention to provide filters wherein the filtering fabric is a non-woven needled textile fabric of such characteristics as to allow its use as the filtering element of both disposable and permanent filters, while the filtering efficiency is preserved or improved and the problems of the prior efforts are avoided. It is a further object of the invention to provide filters with the present needled fabric for use in conventional disposable applications where heretofor unavailable advantages are provided. It is yet a further object of the invention to provide semi-permanent filters, wherein appreciable but limited reuse of the filter is possible. It is yet a further object of the invention to provide filters wherein the cost of the filtering element is sufficiently low that the filter may be economically used as either a permanent or disposable filter. It is another object of the invention to provide filter configurations which will allow the present filters to be used as substitutes for known conventional filters. Other objects will be apparent from the following disclosure and claims.

BRIEF DESCRIPTION OF THE INVENTION

The above and other objects of the invention are provided by a filter for separating solid particulate matter from a suspending gas, which filter comprises an enclosure means for enclosing a volume of gas suspended solid particulate matter and an intake means associated with the enclosure means for passing gas suspended solid particulate matter into the enclosure means. A filter means is associated with the enclosure means for passing gas from the enclosure means and that filter means comprises a non-woven needled textile filter fabric having, on an all fiber basis, a face surface and a back surface with an overall bulk density of at least 6 pounds per cubic foot and a bulk density gradient such that the bulk density of the face surface is greater than the bulk density of the back surface. A filtering gradient is also provided such that the fineness of filtration at the face surface is greater than the fineness of filtration at the back surface. The fabric has a gas permeability of at least 3 cubic feet per minute (CFM) per square foot at a pressure drop of 0.5 inch of water and a fineness of filtration such that the dynamic leakage is 6.0% or less. Most preferably, the filter fabric has a dynamic face loading blindness of no greater than 5.0 inches of water pressure drop across the filter fabric and the filtered solid particulate matter recovery is at least 90%.

In one embodiment of the invention, the filter is configured in the form of a bag with an intake means or discharge means provided by an aperture in the bag and the filtering means is provided by a major portion of the walls of the bag, i.e. that filter fabric comprises at least one half of the enclosure means. Bags of this nature may be constructed by sewing, sealing (cementing or heat sealing and the like) and are capable of containing super atmospheric pressure on the inside of the bag and passing the suspending gas through the walls of the bag. A cake of the solid particulate matter may be formed at the face surface of the bag and the present filtering fabric is of such a nature that the so formed cake may be dislodged from the face surface to allow reuse of the filtering bag.

The present filtering fabric is prepared by needling a batt of staple fibers (e.g. textile fibers) until the needled fabric, on an as needled basis, has at least 6 pounds per cubic foot overall bulk density and a structure which is substantially more uniform and homogeneous than is normally achieved with conventional needled fabrics. The amount of needling required to reach these properties substantially exceeds the amount of needling (needle punches per square inch) usually associated with needled fabric. To obtain this degree of needling, without the barbs of the needles destroying the needled fabric, requires certain kinds of needling procedures.

The so-needled fabric may be impregnated with a filler to increase the overall bulk density of the filter fabric and to provide additional desired properties to the filter fabric. The filler, however, will not substantially increase the pressure drop across the needled fabric and this result may be achieved by careful impregnation of the fabric. In any regard, the permeability of the filter fabric should be at least 3 cubic feet per minute/square foot, as described above. In the preferred embodiment, the filler will also form a filler density gradient with density increasing from the back surface to the face surface of the filter fabric.

With density and filtering gradients provided by the present fabrics, important additional advantages will be obtained. When the more dense face surface of the fabric faces the direction of flow of the gas suspended solid particulate matter, the greatest fineness of filtration of the filtering fabric is immediately encountered by the suspended particulate matter and a cake of the filtered matter will form at the face surface of the filtering fabric. This increases the ability to dislodge the so formed cake and to recover the filtered matter if desired. Also, it increases the repeative use of the filter, since the filtered matter will not substantially penetrate into the non-woven fabric.

On the other hand, if the less dense back surface faces the direction of flow of the gas suspended solid particulate matter, substantial amounts of the particulate matter will be trapped within the filtering fabric. This allows a greater amount of filtered solids to be gathered and retained by the filtering fabric. This can be used most effectively in disposable kinds of filters.

The combination of the more dense face surface and the less dense back surface provides superior filtering characteristics, minimum weights (ounces per square yard) and maximum permeability of the filter.

BRIEF DESCRIPTION OF THE DRAWINGS

FIG. 1 is an idealized view of an embodiment of the present filter fabric where the "A" portion shows various optional features, including a filler, inner and outer supporting structures and an internal support, and the "B" portion shows only the optional but most preferred filler and the fabric.

FIG. 2 is a diagrammatic illustration of a separator bag for an air conveyor system wherein the bag functions as a filter.

FIG. 3 is a diagrammatic illustration of a filter configuration suitable for a furnace or air conditioner.

FIG. 4 is a diagrammatic illustration of an industrial vacuum machine wherein a bag configuration of the present filter fabric is used.

FIG. 5 is a diagrammatic illustration of a conventional automobile filter using the present filter fabric.

DETAILED DESCRIPTION OF THE INVENTION

Figure 6:
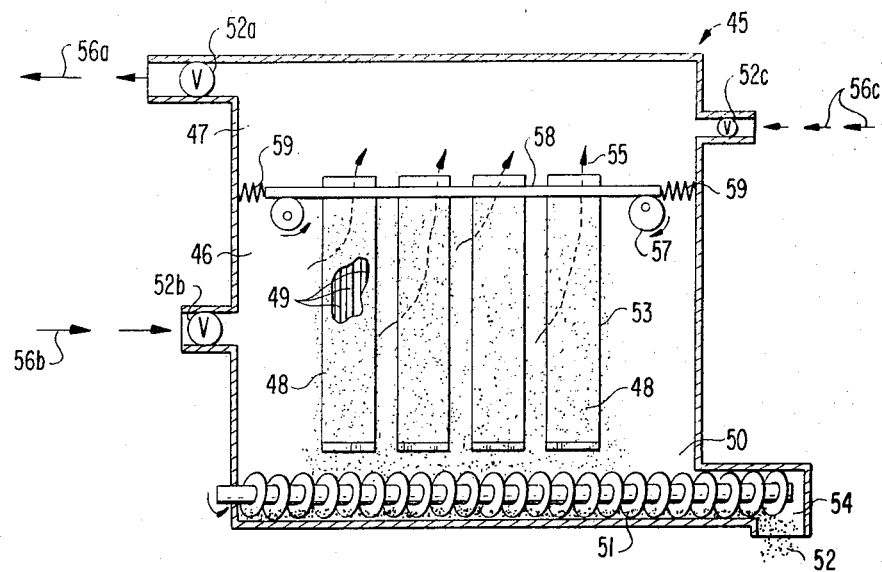
FIG. 6 is a diagrammatic illustration of a conventional bag house containing bags made from the present filter fabric.

FIG. 1 shows an idealized diagrammatic illustration of a cross-section of the present filter fabric, generally designated 1, and is illustrated with various optional features in the "A" portion and with only the optional but best mode feature, i.e. a filler, in the "B" portion. The fabric has a face surface 2 and a back surface 3. The fabric is composed of needled staple fibers 4. It should be fully appreciated that the present high performance characteristics are provided by the needling alone and that the present filter fabric will serve most adequately on an as-needled basis without any of the further features of the present invention. However, the as-needled fabric may be compressed or otherwise treated in a manner to act upon the fibers to adjust the various characteristics. Fabrics processed so as to leave the as-needled fabric composed of only fibers is defined herein as "on an all fiber basis". Indeed, in some applications, it is preferred that the filtering fabric be the fabric as-needled (or at least on an all fiber basis) with no further features of the invention added thereto.

However, if desired, the present filtering fabric may be reinforced by a woven web 5, made of either textile fibers, metal fibers, glass fibers, yarns, natural fibers, and the like. Alternately, the reinforcing fabric 5 may be a metal or plastic mesh, screening, etc. It is emphasized, however, that reinforcing of this nature is not required.

If desired, the present filtering fabric may be sandwiched between two reinforcing members 5 and 6, of the same or different size (reinforcing member 6 being shown as a different size in FIG. 1) and of the same or different materials. These reinforcing members may be glued, stapled, sewed or mechanically attached to filter fabric 1.

It will be noted that the fabric has a bulk density gradient with density, generally, increasing from back surface 3 to face surface 2 (although not necessarily in a linear or even continuous manner). One embodiment of this density gradient is diagrammatically illustrated by the parallel horizontal lines 7 with the intensity of the lines increasing from the back surface to the face surface.

The filtering fabric may have disposed therein a filler 8, which is the preferred (best) mode and will be explained hereinafter more fully. The filler preferably contains a polymeric material of an elastomeric nature. The filler is contained in the filter fabric in amounts sufficient to increase the overall bulk density and to provide other desired properties. Additionally, the filler will tend to increase the fineness of filtration of a fabric. It is, however, most important that the filler not form an impervious barrier within the filter fabric and, indeed, the filler should not substantially reduce the permeability of the all fiber fabric, i.e., the permeability should not be reduced by more than 25%, preferably no more than 15%, by the introduction of the filler.

It is also preferred that the filler form a gradient from the back surface to the face surface and FIG. 1 shows such a distribution of the filler so that a filler gradient is established.

The present filter fabric is most suitable for separating solid particulate matter from a suspending gas. The gas may be chosen as desired, e.g., air, water vapor, nitrogen, oxygen, argon, helium, hydrogen, hydrocarbons, (methane, ethane, butane, chloroform) or any other desired gas. It is only necessary that the gas not be so corrosive (e.g., aqua regia vapors) that it will substantially degrade the fibers forming the filter and/or the filler therein.

The solid particulate matter, likewise, may be chosen from any non-deleterious solid particulate matter. For example, the solid particulate matter may include conventional industrial and house dusts, fines from a pulverizing operation, e.g. pulverization of coal, calcium carbonate from carbonating reactors, industrial waste, and the like. It is only necessary that the solid be entrainable (e.g., suspendable) within the gas stream.

Generally, the filter of the present invention may be illustrated by a variety of specific embodiments. Typical of such specific embodiments are FIGS. 2-8. In FIG. 2, there is shown a conventional air conveyor separator bag 10, which together with its impervious top 11, a tied bottom end 12, and a bag 13 of the present filter fabric form an enclosure means for enclosing a volume of gas suspended particulate matter. There is an intake means 14 associated with the enclosure means (the bag) for passing gas suspended solid particulate matter via entry conveyor 15 into the enclosure means. The filter means of this arrangement, which is associated with the enclosure means, is the entire separator bag 13 which is constructed of the present filter fabric. Air passes through the filter fabric, as illustrated by arrows 16, in view of the favorable permeability of the bag. The solid particulate matter being conveyed, e.g., small polystyrene plastic beads, will be collected as "cake" on the inside of the bag and when the separator bag has been filled to its working capacity, the separator bag will be emptied via bottom end 12.

FIG. 3 shows a typical furnace intake plenum filter, although that filter may be used with equal facility as an air conditioner filter, either as a window air conditioner or as a central air conditioning system. Here again, there is an enclosure means generally 20 and composed of a frame 21 along with support rods 22. The present filter fabric 23 intercepts solid particulate matter impinging thereon via gas stream 24. A furnace or air conditioner filter of that nature may be either disposable or semi-permanent, or with sufficient support members for repeated use, could be a permanent filter. That is because the present filter fabric is of such high performance characteristics that it may be repeatedly used by removing the cake therefrom. The fabric may be washed with a detergent solution and dried for reuse in the manner of conventional polyurethane foam filters.

FIG. 4 shows an industrial vacuum cleaner 30 having a filtering bag 31 for separating industrial dust passing into the vacuum cleaner via intake hose 32. Air is, of course, passed through the bag as illustrated by arrows 33. Periodically, the bag (shown in its inflated state) is removed from the cleaner by unlatching the retaining member 34 and emptying the bag via its intake means 35.

FIG. 5 shows a typical automobile engine air cleaner filter, generally 40, wherein the enclosure means is formed by the air cleaner in combination with the conventional plastic retaining rings 41 which sandwich the present filter fabric 42. That filter fabric may be in combination with support members, such as illustrated in FIG. 1, or it may be fluted (as shown) in the conventional configuration and in that form support members may not be required. In this case, of course, dust laden air, shown by arrows 43, forms a cake on the outside of the filter and the filtered and cleansed air pass into the carburetor of the engine, as illustrated by arrow 44. This is an example of a "back surface loading" filter, as explained more fully hereinafter.

Another embodiment is shown in FIG. 6 where a conventional bag house, generally 45, has an intake plenum 46, a discharge plenum 47, a plurality of bottom closed/top opened filter bags 48, suitably supported on the inside by rods 49 (or any other conventional support such as wire mesh, expanded sheet metal, wire netting, etc.), a cake collection plenum 50 and a cake removal screw 51 turned by a power source (not shown) for discharging the collected cake through cake discharge 52 into a suitable collector, such as a drum (not shown). Valves 52a and 52b control the flow of, respectively, the filtered gas out of the housing and the dust laden gas into the housing. In operation, dust laden gas enters plenum 46 via opened valve 52b and the dust is deposited on bags 48 as cake 53 (part of which may spontaneously sluff off and fall into collector plenum 50) and the filtered gas passes through the walls of the bags, up the bags and into plenum 47, as shown by arrows 55, and out of that plenum by opened valve 52a. Periodically valve 52a is closed and valve 52c is opened to cause bags 48 to expand outwardly and dislodge additional cake 53. The valves are then returned to their original positions. Thus, periodic pulsed gas streams results, as indicated by pulsing arrows 56a, 56b and 56c. Cake 53 is further dislodged by cams 57 shaking top plate 58, which plate is moveable by virtue of flexible portions 59, e.g. a bellows material.

Figure 7:
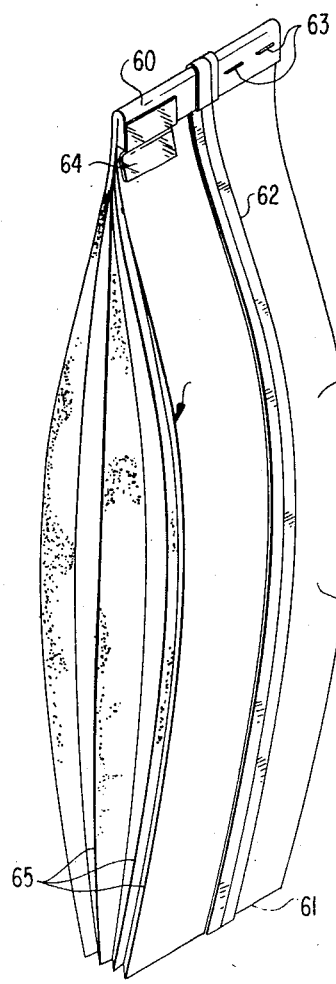
FIG. 7 is an illustration of a home vacuum cleaner bag using the present filter fabric.

FIG. 7 shows such a preferred embodiment in the form of a conventional home vacuum cleaner bag which is formed from the present filtering fabric. The bag has a folded top 60 and a bottom aperture 61, which serves as an intake for the bag. The tubular configuration of the bag may be provided by sewing opposite edges of flat fabric together, as illustrated by folded and sewed seam 62. Instead of folding, however, that seam may be cemented or sealed, e.g., heat sealed. For example, that seam may be prepared by using heat-fusable fibers in producing the filter fabric and then effecting a sealing by the same with a conventional hot iron sealing machine which fuses the fibers into a heat seal at the joined edges of the fabric. Of course, means other than a hot iron sealing means may be used, e.g., high frequency sealing machines and induction sealing machines, all of which are well known to the art and need not be described in any detail herein.

The so formed tubular shape may be closed at top 60, again, by sealing or sewing. Alternatively, it may be closed by conventional staples 63 or by tape 64 or by placing a film of heat fusable material between the pieces of fabric to be retained or over the flap to be secured and heat sealing that fusable film into the open pores of the present filter fabric. Also, for heat sealing and cementing purposes, the present filler may be heat sealable or rendered tacky by the application of a solvent.

Alternatively, the mechanical forming of a tube may be avoided by needling the fabric in tubular form, e.g., with a Delos needling machine which is well known in the art.

All of the foregoing methods and others readily apparent to those skilled in the art may be used in producing the present filters and the easy and wide modes of construction are important features of the present invention, since any conventional construction manner may be used, as opposed to more unconventional manners, as is necessary with some non-woven filter fabrics.

Of course, in the conventional mode of operation, dust laden household air is forced into the bag via aperture 61 which fits on a corresponding nozzle of the vacuum cleaner, and the filtered air exits the bag as shown by the arrows. The bag may have a typical gusset construction 65 to allow expansion of the bag under the super atmospheric pressure induced therein by the vacuum cleaner.

Bags of this general configuration are well known to the art and are conventionally represented by paper filter bags which are characterized as non-reusable or throw-away filter bags. Such bags, however, have a distinct disadvantage in that fine materials, such as face powder, plaster dust, ashes and soot may seal the interstices of the throw-away bags and even though the bag appears to be only partly filled with dirt, the filtering action will be severely limited and the filtering efficiency will be greatly reduced. Bags constructed of the present filter fabric do not suffer from this disadvantage.

Figure 8:
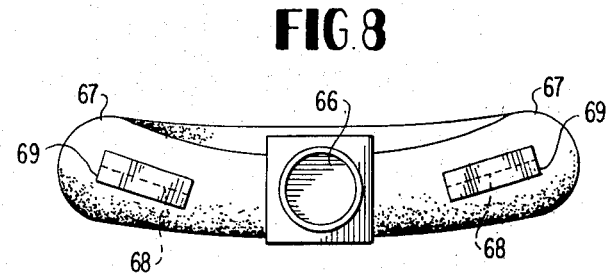
FIG. 8 is an illustration of another home vacuum cleaner bag using the present fabric, but which may be provided with taped openings to allow a semi-permanent use thereof.

The fabrics of the present invention are such that they may be used as semi-permanent bags. Such a bag is illustrated in FIG. 8 as another conventional home vacuum cleaner bag which has a central aperture 66 in a retaining flange (for ease of installation and removal in a corresponding female slot on the home vacuum cleaner). The bag has lobes 67, which have slits 68 therein and the slits are covered by strippable and readherable tape 69 so that an opening into the bag may be obtained by removing the tape. The dust and dirt collected in the bag may therefore be removed via slits 68 and aperture 66. After removing the dust and dirt, the readhesible tape is again placed over the slits and the bag may be reused. Bags of this nature may be used many times, e.g. 3, 5, 10, 20 or more, and in that sense form a semi-permanent bag. This avoids buying a new disposable bag each time a bag fills, while the cost of the bag is not substantially more than the conventional disposable paper bags, which is a very important feature.

From the foregoing embodiments, it will be noted that the filtering fabric comprises at least a major portion of the enclosure means, e.g. at least ½ of the enclosure means. This is a preferred form of the invention, and in a more preferred form, where the filter is in the form of a bag, the filter fabric will comprise essentially all of the walls of the bag.

Figure 9:
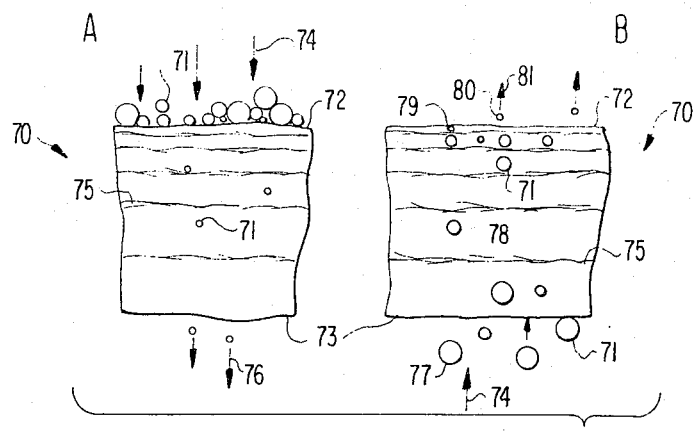
FIG. 9 is a highly idealized diagrammatic illustration of the filtration function performed by the face surface and the back surface of the present filter fabric.

FIG. 9 diagrammatically shows in a highly idealized form an important feature of the invention, in connection with the overall bulk density gradient and the filler gradient. In FIG. 9, the present filter fabric is generally indicated by 70 and is shown as two broken pieces thereof, "A" and "B". The A portion illustrates the filtering effect of the present fabric when the gas suspended solid particulate matter 71 strikes face surface 72 (face loading), while the B portion illustrates the filtering effect when solid particulate matter 71 strikes the back surface 73 (back loading). The arrows 74 show the direction of flow of the gas suspended solid particulate matter. The overall bulk density and the filler gradient are illustrated by the intensity of the lines 75 and it will be noted that the intensity of the lines increases from the back surface to the face surface. This diagrammatically illustrates that the bulk density also increases from the back surface to the face surface and, likewise, that the amount of filler disposed within the fabric increases from the back surface to the face surface. It is again emphasized, however, that these gradients need neither be linear nor even continuous. It is only necessary that the fineness of filtration be greater at the face surface.

As shown in FIG. 9, as the flowing gas suspended solid particulate matter 71 encounters face surface 72 of the A portion of filter fabric 70, it encounters the greatest fineness of filtration of the fabric. Thus, the solid particulate matter will collect as a cake at or near the surface of the filter fabric. It can be appreciated, therefore, that the back portion of the filter fabric functions to give strength and rigidity to the fabric while the essential filtering function takes place at the face surface. This highly entangled fibrous face surface collects the cake and makes dislodgement of the cake relatively easy, as explained more fully hereinafter.

On the other hand, when the gas suspended solid particulate matter first impinges the back surface 73, only the larger particles of solid particulate matter 77 will be retained at the face surface and smaller particles 78 will be trapped within the filter fabric. Finally, particles 79 will be trapped just at or under the face surface and smaller particles 80 will pass therethrough as shown by arrow 81. In this embodiment, the filtered solid particulate matter will be distributed throughout the filter fabric. This will allow substantial amounts of filtered solids to be retained by the filter fabric. This arrangement is particularly of value where the filtered solids are either to be recovered or where the filter fabric is not to be reused, e.g., an automobile air cleaner, or where the maximum length of time is desired before shutting off the filter stream for cleaning of the filter, e.g., a cartridge filter.

Figure 10:
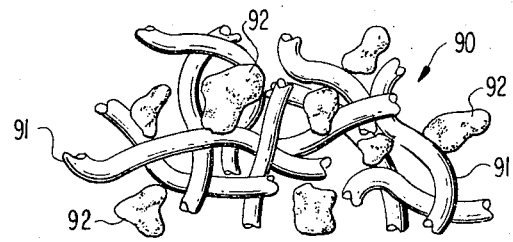
FIG. 10 is a highly idealized diagrammatic illustration of the disposition of filler within the present filter fabric.

FIG. 10 is a highly idealized diagrammatical illustration of how the filler may be disposed within the filter fabric. Thus, the filter fabric, generally 90, is composed of needled fibers 91 having filler 92 disposed in, among and around those fibers. It will be noted that open interstices still provide great voidage for passage of gas. The filler can contribute to the overall properties of the fabric, and particularly the bulk density. With polymeric fillers, for example, an overall bulk density of the filter fabric of at least 13 pounds per cubic foot may be easily obtained. Actually, overall bulk densities of at least 20 pounds per cubic foot may be obtained with such fillers. Even at these high overall bulk densities, the permeability of the filled fabric is not significantly reduced. These fabrics will have a gas permeability of at least 3 cubic feet per minute per square foot and more often at least 6, 12, or 18 CFM.

By providing the filler in an increasing gradient from the back surface to the face surface, the efficiency of filtration is also enhanced by virtue of the filler intercepting solid particulate matter. When the filler is tacky, such as a low molecular weight elastomer, increased filtration will be obtained by virtue of adherence of solid particulate matter, irrespective of its size, to the filler.

The filtering efficiency of any filter fabric may be established by standard filtering efficiency tests. These tests are, essentially, empirical in nature, but the tests have been related to operating characteristics of filter fabrics for filtering dust laden air. These tests are based on the use of a conventional home vacuum cleaner machine, since such machines are convenient apparatus for directing dust laden air into a filter constructed of a test filtering fabric. The particular home vacuum cleaning machine used for conducting the test is not critical, so long as the machine is capable of generating about 10-15 inches of water pressure in a totally blocked air discharge configuration. Neither is the particular construction of the bag used in the vacuum cleaner test critical, but the bag should be constructed in a manner to minimize leaking of the bag through construction and attachment areas, e.g., through sewed seams, folded gussets, and at the bag collar. However, it is preferred that the test be conducted on an upright-style vacuum cleaning machine, since this style allows for a simultaneous flex test of the filter fabric and simulates the effectiveness of the filter fabric in applications where flex of the filter fabric accompanies the filtering application. This is, of course, a more severe test.

Dynamic Leakage Test

Figure 11:
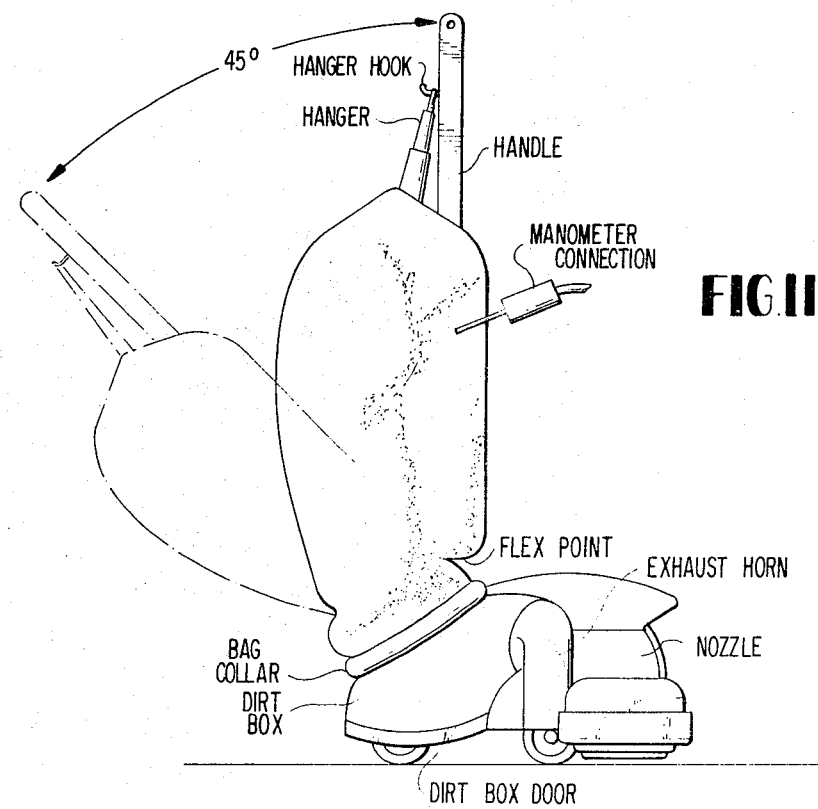
FIG. 11 is a diagram of an arrangement used for testing the present filter fabric.

In this test the bag constructed for the test is attached to a conventional home vacuum cleaning machine with care to prevent leakage either at components of the machine itself or at the point of attachment of the bag to the machine. FIG. 11 shows the essential arrangement for this test. Note that the door of the dirt box should be sealed, e.g., with tape and the like as well as the junction between the dirt box and exhaust horn. Also, if the bag collar does not fit tightly onto the dirt box, sealing devices such as twisted wire, tape and the like may be used. In any event, care should be taken to seal these points of extraneous entry or exit of air in order that the test may be as accurate as possible.

As noted in FIG. 11, the bag is attached to the handle in the conventional manner of a hanger engaging the top of the bag and a hanger hook. The handle of the machine is arranged with appropriate mechanical devices to cause a 45° oscillation of the handle during the testing procedure in order to effect the flex test noted above.

For the present testing purposes, the bag was constructed according to the configuration of FIG. 7, with the exception that the top of the bag was held in the folded-over position by a sewed seam. The bottom opening of the bag was also gathered and had elastic sewed therein in order to effect a snug fit between the opening of the bag and the opening of the dirt box.

The bag and the dirt box trap was tared to the nearest gram and then properly placed on the machine, with sealing of the dirt box door as noted above. Additionally, a wire was twisted around the bag at the bag collar to insure a tight seal between the bag and the opening of the dirt box. Likewise, the juncture between the exhaust horn and dirt box was sealed.

The nozzle height was adjusted to its greatest opening in order to insure unobstructed flow thereinto. The handle of the vacuum cleaner machine was attached by appropriate mechanical linkage to a reciprocating machine so that the handle occasioned an oscillation of 45° at a rate of 9 cycles per minute.

A timer is provided to cut the motor of the vacuum cleaner on and off so that there is a 2.5 seconds on and a 6.0 seconds off. This on/off cycling is not related to the oscillation of the handle to insure random oscillation and random cycling of the vacuum machine on and off.

After the machine has run for approximately 3 minutes to insure proper warm-up, 142 grams of the standard powder, identified below, is slowly fed into the vacuum cleaner. This may be carefully fed into the machine through the nozzle or it may be fed into a hoze coupling if the cleaner is so provided. In any event, it is only required that the standard powder be carefully fed into the machine to insure that all of the powder is acted upon by the vacuum air stream. A manometer connection, flexibly attached to the bag, reads the pressure inside the bag in inches of water. The pressure in the bag during the initial warm-up period is noted and the pressure drop inside of the bag after feeding the standard powder thereinto is also noted. During this test the oscillation of the handle is accomplished by the reciprocating machine. One-thousand cycles should be performed and the time for each cycle should be approximately 6-8 seconds.

After the test has been completed, the machine is turned off and a visual inspection is made for any obvious passage of the standard powder through the bag. If more than three areas of greater than ½ inch in diameter are noted where powder has passed through the bag, the filtering fabric fails the test for lack of uniformity. If these areas of failure are at the flex points, then the filter fabric may additionally fail for lack of flexure resistance.

The bag and dirt trap are removed from the machine and weighed. The tared weight thereof is subtracted from the loaded weight thereof and the results divided by 142, and multiplied by 100, to obtain the percent leakage. As can be appreciated, if all of the test powder is retained by the bag, then all of the 142 grams of test powder will be recovered and no leakage will have occurred, resulting in a dynamic leakage value of 0.00%, i.e., a perfect bag as far as dynamic leakage is concerned.

The present filter fabric provided dynamic leakage values of no greater than 7% and most often less than 4%. A leakage of less than 1.5% is a desired target value.

The standard powder is the talc powder described in ASTM Dirt Recovery & Bag Leakage test. This is USP Grade Supreme Talc or equivalent. Powders of this nature are available from United Sierra Division of Cypress Mines Corp., Trenton, N.J. This is a commercial talc and has the following analysis.

| 0.5% | greater than | 44 | Microns |
|---|---|---|---|
| 12.5% | | 20-43.9 | " |
| 27.0% | | 10-19.9 | " |
| 23.0% | | 5-9.9 | " |
| 20.0% | | 2-4.9 | " |
| 8.0% | | 1-1.9 | " |
| 9.0% | less than | .9 | " |
| 100.0% | Total | | |

Fabric Blinding and Recovery of Permeability Test

This test uses the same apparatus described in connection with leakage test. Here again, the bag and dirt trap are tared and the bag and dirt trap assembled onto the vacuum cleaner with appropriate sealing as noted above. The nozzle is also adjusted to give adequate clearance for full flow of air into the nozzle and a minimum warm-up running time of 3 minutes is used. After the machine has been warmed-up, 4 ounces of commercial soda separated into four equal parts are fed serially into the machine. The pressure inside of the bag is noted prior to and after the addition of each portion of the soda and, after the last portion is fed to the machine, a two minute further run is provided and the machine is then cut off. After unhooking the bag from the handle at the hanger hook, it is vigorously shaken for four quick shakes in each of two directions (total eight shakes) and the soda is allowed to settle out of the bag and collect in the dirt trap. The soda is collected from the dirt trap and weighed. The weight of recovered soda is divided by four ounces and multiplied by 100 to obtain the percent recovery. The dirt trap and bag are reassembled onto the vacuum cleaner and after again starting the machine the pressure inside the bag is measured.

The above procedure is repeated three times, i.e., 12 ounces of soda are fed to the machine, 340.8 grams. After each cycle, the pressure drop across the bag (prior to feeding the next 4 ounces of soda into the bag) should be no greater than 5 inches of water, preferably no greater than 4 inches of water and a target value is where the pressure drop does not exceed 3.3 inches of water. The soda used in this test is USP soda.

Permeability Test

The permeability of the fabric is measured by an instrument which expresses the permeability of the fabric in terms of cubic feet per minute per square foot at a pressure drop of 0.5 inch of water. This corresponds to ASTM test procedure #D-737. This is also known as a Frazier permeability test. The instrument holds the test fabric in a jig such that an air flow is passed through the test fabric. The air flow is provided by a blower and the speed of the motor which turns the blower and draws air through the test fabric is adjusted until a 0.5 inch pressure drop across the fabric is obtained. The air flow through the fabric is measured by a standard orifice/manometer arrangement and a set of orifices are provided for measuring air flows from 1 to 700 cubic feet per minute per square foot of fabric. With the present filter fabric, permeabilities (Frazier) of at least 3 cubic feet per minute per square foot and up to 50-60 cubic feet per minute per square foot may be obtained.

To obtain such fineness of filtration, the overall bulk density must be significantly higher than ordinary needled fabric. Thus, the overall bulk density must be at least 6 pounds per cubic foot, and more preferably at least 10 or 15 pounds per cubic foot. Ideally, the overall bulk density will be high as at least 20 pounds per cubic foot, all on an all fiber basis (without fillers, etc.). The thickness of the fabric in inches, for density purposes, is measured by ASTM test procedure #D-461.

Further, to insure a proper overall bulk density gradient, the bulk density at the face surface should be at least 50% greater than the bulk density at the back surface and more preferably at least 100%, e.g. at least 200% greater. This will insure a gradient to effect the filtering characteristics described hereinafter.

The process of U.S. Pat. No. 3,817,820 is quite suitable for producing the present filter fabrics and that disclosure is incorporated herein by reference. However, basically, fibers are carded onto a conveyor in such a manner that there is a needled pick-up gradient, as defined in that patent. This is conveniently accomplished by using fibers of different deniers and/or different lengths which results in different ease of fiber pick-up by the barbs of the needles and ease of working the fibers into a densely entangled structure. After appropriate needling, which in the present case is usually in the range of at least 5,000 needle punches per square inch, and more usually at least 6,000 to 8,000 needle punches per square inch, the fabric is ready for use as the present filtering fabric. With such needling, the fibers will be coherently entangled into an integral structure having the present face surface and back surface, as well as the present bulk density gradient. If desired, and as is often the case, the as-needled fabric may be adjusted in density and gas permeability by hot calandering the fabric or otherwise hot compressing the fabric to densify it. Temperatures between 275° F. and 475° F., e.g., 320°-425° F., are suitable and pressures, e.g., linear nip pressures between 20 and 500 pli, e.g., 30 and 150 pli are suitable.

It should be carefully understood that the needling must be of a type and character so as to develope a highly randomized network of highly entangled fibers wherein a large percentage of the fibers in the body of the structure is oriented in the Z direction (thickness direction), while at the same time the fibers at and near the face surface are densely entangled but form a uniform surface in regard to filtering characteristics.

Fabrics of the present nature are a result of, among other things, the special needling technique used in producing the fabrics, as opposed to conventional needled fabrics. Generally speaking, conventional needled fabrics are produced by needling a batt with depth of needle penetration such that the foremost barb of the needles passes about three-eights of an inch beyond the opposite face of the batt, i.e., the face opposite the face from which needling commences. The foremost barb, as well as other barbs on the shank of the needle, carries into and through the batt bundles of fibers in a looped configuration and the curved end of the loop of fibers passes through the batt entirely when the barbs of the needles penetrate through the batt to the foregoing extent. Also, in a fairly large percent of the needle penetrations, the fibers of the loops are so pulled through the batt that the loop configuration is destroyed and the needling produces only shanks of fibers extending beyond the face of the batt. Further, when the so-needled structure is then similarly needled from the opposite side, the needles pick up the protruding loops and shanks of fibers and again force these, at least in part, entirely through the batt and lodges them beyond the opposite face. Thus, the result of this type of needling operation is to produce a structure wherein the majority of fibers are bound and/or held together as though the batt were a sewed structure and this structure has been referred to in the art as a ligated structure.

In contrast thereto, with the present fabric, it is preferred that the foremost barbs of the needles do not penetrate the opposite face of the composite to any substantial extent and, therefore, the end of the loop of fibers carried by the foremost and other barbs, if any, do not protrude through the opposite face of the composite and a series of potential interlooping and interlocking of loop centers are produced. When the composite is then needled from the opposite face with similar low penetrations, the ends of the loops formed from one face and then from the opposite face can interloop and interlock.

With the present very large number of needle penetrations per square inch and with the procedure as discussed above, an entanglement network of interloopings and interlockings of the loops is accomplished by the needling operations. These interloopings and interlockings of loops provide a system of random fiber entanglement which, thusly, provides a structure or network which has the present unusual properties.

Thus, for purposes of the present specification, the terms "random fiber entanglement" refer to random interlooping and interlocking of loops of fibers which is produced by needling a composite of staple fibers wherein the foremost barb of at least 75% of the needles does not penetrate, substantially or only slightly, through the opposite face of the composite being needled, and wherein the number of needle penetrations per square inch is sufficient that the final density of the fully needled fabric is at least 6 pounds per cubic foot. In this regard, the terms "substantially" or "slight", in connection with the needle penetrations is defined to mean not more than about one-sixteenth inch beyond the opposite face. This amount of penetration beyond the opposite face is acceptable and in keeping with the foregoing disclosure, since depending on the characteristics of a given fiber, some retraction of the loops may take place when the needles are withdrawn.

With a fabric of this nature, a randomly entangled but uniform filter fabric is obtained which also has improved physical properties, especially stitch tear strength, e.g., stitch strengths of at least 50 or even 100 lbs/inch of width. A significant difficulty of prior needled filter fabrics is that the needling was of the ligated type, discussed above, and this mode of needling left relatively large "funnel-shaped-holes" in the fabric (where stalks of fibers passed through the fabric). At the same time, since most of the fibers remained relatively undisturbed by the relatively low number of high penetration needle punches, the predominate orientation of the fibers is in the X-Y direction (the plane of the fabric) with relatively little Z direction orientation and relatively little entanglement. Thus, these fibers would quickly "pack" at the surface and either "blind" the filter fabric or cause high filtering pressure drops. At the same time, the large number of relatively large holes allows passage of relatively large solid particles. If calandering, impregnation or other techniques were used to correct this latter problem, the pressure drop markedly increased.

Thus, in summary, these prior needled filter fabrics could not combine the necessary co-extensive properties of low pressure drop (high CFM passage at the standard pressure drop) and fineness of filtration. Also, the prior fabric, due to the nature of the relatively unentangled fiber surface would rather quickly "blind" and could not effectively dislodge the filter cake—hence rendering these prior fabrics unsuitable for true "permanent" type filter such as vacuum cleaner bags.

This degree of needling will also provide exceptionally high tear and tensile strengths. These strengths are based on standard tests for non-woven fabrics, which tests are well known in the art and need not be described herein.

The foregoing properties are in regard to the all-fiber fabric, although the present filter fabric may have associated therewith either woven or other non-woven fabrics. For example, as is the general practice in laying a web of fibers for needling, a woven or non-woven fabric or yarn system will act as a carrier for the fibers until the fibers are substantially consolidated into the needled batt. This is in keeping with the process of the above noted U.S. Pat. No. 3,817,820. FIG. 1 shows the same in that a previously prepared woven fabric 9a or a previously prepared non-woven fabric or yarn system 9b is contained therein. These carriers are associated with the fibers prior to needling, and after the needling the previously prepared carriers may not be substantially intact as shown at 9c but substantially deteriorated during the needling process. On the other hand, the carrier may remain substantially intact as shown at 9a and 9b. Examples of woven fabric are lightweight open weave polyester fabric and lightweight open weave jute. Examples of non-woven fabric and yarn systems are conventional "spun bonded" scrim and warp yarns arranged sufficiently close to each other to contain the carded fibers until sufficient needling is performed.

The present filtering fabric may be provided with a decorative outer surface and in this case the woven fabric 5 or 6 of FIG. 1 may be decorative in nature and not utilitarian in nature. Alternatively, if a decorative outer portion is desired, the needled fabric per se may be printed in a conventional manner or a woven or non-woven fabric may be printed or otherwise decorated and laminated to the present filtering fabric.

The filler may include any inert solid, either organic or inorganic which contributes to the overall bulk density of the structure. Examples of inorganic fillers are finely divided bentonite, chalk, kaolin, talc, clays, asbestos, diatomaceous earth, silica flour, mica, magnesium silicate, zeolites, carbon black, zinc oxide, barytes, ferric oxide and the like. Examples of organic fillers are plasticized polyvinyl chloride, natural rubber, butadiene rubbers, polychloroprene rubbers, polyurethane rubbers, silicon rubbers, etc. Also, the filler may be a natural polymer, e.g., collagen or a synthetic polymer or copolymer such as the acrylate polymers, acrylonitrile polymers, silicon rubbers, chloro-sulfonated polyethylene, polyethylene and polypropylene, plasticized polyvinyl chloride, Kel-F type copolymers of tetrafluoroethylene and chlorotrifluoroethylene, fluorosilicone rubbers such as Silastic LS 35, poly(alkylene oxide) polymers and natural rubber or any of the conventional textile fillers. Or any of the natural and synthetic elastomers may be used, including polymers and copolymers of butadiene, isobutylene, butene and pentene, polysulfides, polychloroprene, polyesters, e.g. the Paraplex and Norepol rubbers, polyurethane and copolymers of alkyl acrylates and vinyl ethers.

Preferably, the filter is a combination of an inorganic material and a polymer.

The method of impregnating the filler can be as desired and any of the conventional procedures may be used, including solvent deposition, in situ polymerization, and the like, but for convenience and simplicity, it is preferred to simply impregnate the fabric by padding to the correct add-ons with a pad and nip. This method is especially convenient when a latex, e.g., acrylate latex, is used as the filler elastomer. Thereafter the elastomer latex is precipitated or coagulated. Any conventional means of coagulation may be used, e.g., by drying.

Thereafter, the filler impregnated fabric is cured and dried, if required. The curing and drying temperatures will be those consistent with the particular filler being used, all of which is well known in the art. However, for example, temperatures for acrylate latex of between 200° F. and 300° F. and times of between 10 minutes and 30 minutes are satisfactory.

The particular composition of the fibers is not critical to the invention, and various combinations of fibers may be used. These combinations may include natural fibers of plant or animal origin such as cotton, collagen and wool, and synthetic fibers such as nylon, acrylics, olefins, e.g. polyethylene, polypropylene, polyvinyl chloride, polyvinyl acetate/polyvinyl alcohol, polyvinyl chloride/polyvinyl vinylidene and polyester. The preferred fibers, however, are commercial staple fibers, e.g. textile fibers such as nylon and/or polyester fibers, since these fibers provide excellent workability in the process and have inherent chemical properties which resist degradation.

The preferred combination is where the filter fabric is substantially composed of staple synthetic textile fibers and a filler contains both an inorganic material and a synthetic polymer. More preferably, the fibers are polyester fibers and the filler is an acrylate/clay combination.

The invention will be illustrated by the following example, but it should be understood that the invention is not limited thereto but extends to the foregoing breadth.

EXAMPLE

This example uses the process and apparatus described in U.S. Pat. No. 3,817,820, in regard to the arrangement and operation of the carding machines, conveyors and needling machines. Accordingly, the details of the apparatus for performing the present needling in the specific modes of operation thereof will not be described for sake of conciseness.

In this example four carding machines were used. The first carding machine laid down 2.1 oz (per square yard) of 1.5 denier and 1.5 inch length polyester fibers supplied by Eastman Kodak Company. The second carding machine laid down 2.1 oz (per square yard) of 3 denier and 2 inch length polyester fibers of the same source. On top of these two batts of carded fibers was laid a Reemay of 1 oz per square yard manufactured by the Dupont Company. This forms a carrier for the fibers prior to consolidating into a needled batt. The third card laid down the same fibers as the second card and in the same amount, as did the fourth card. After compression under a roller on a conveyor belt, the batt of fibers was fed to a succession of FIBERWOVEN needling machines. There was approximately 10,000 needle punches per square inch of the finished needled filter fabric.

On an as-needled basis, the needled fabric weighed about 9.5 oz per square yard with a minimum weight of about 8.75 and a maximum weight of about 9.75. The thickness varied between 2.1 and 2.9 millimeters with an average of about 2.5 milimeters. The tensile strengths (kilograms per square centimeter) were between 6.0 and 12.0, with an average of 8.0, in the machine direction and 11.0 to 20.0, with an average of 14.0 in the transverse direction. The density of the needled product was between 6.0 and 9.5 pounds per cubic foot, with an average of about 7 pounds per cubic foot.

The needled fabric was impregnated to saturation with a conventional acrylic latex in a pad and then nipped by counter rotating rolls to an add-on of about 44%. The impregnated product was dried on cans at a temperature of about 250° F.

The dried weight of the impregnated fabric was between 12.5 and 14.0 oz per square yard, with an average weight of about 13.25 oz per square yard. The thickness varied between 30 and 34 mils with an average of about 32 mils and the air permeability (Frazier in CFM per square foot) varied between 7.0 and 15.0 with an average of about 11.0. The density of the fabric varied between 30.6 and 38.8 pounds per cubic foot with an average of about 34.5 pounds per cubic foot.

The impregnate latex was prepared by mixing a commercially available acrylic latex (Hycar 2600X189) with an antifoam (Dow Corning H10) and adjusting the pH with water and ammonia until the pH was above 9. The amount of acrylic used in the formulation was 17.17 pounds on a dry basis and 0.01 pounds of antifoam on a dry basis. To this mixture was added a mixture of clay (Hydrite R), water and a dispersing agent (Tamol). This clay mixture included 11.9 pounds of clay on a dry basis and 0.61 pounds of the dispersing agent on a dry basis. There was further added to the combination, 0.6 pounds of zinc stearate on a dry basis along with sufficient water for mixing thereof. This latex mixture has a total solids of 29.9% and is stable for long periods of time.

The filter fabric is cut and formed into a filter bag, similar to that shown in FIG. 7. The bag is assembled by sewing the longitudinal seam and stapling the folded portion. The bag is used to replace a woven filter bag on a conventional Kirby upright home vacuum machine. The bag increased the filtering efficiency of the vacuum machine by at least 25%, as measured by the CFM per square foot output as opposed to the CFM output of the woven bag, and picks up and retains essentially all dust particles encountered in normal carpet dust. Additionally the bag will retain face powder and chalk powder while not pluging the interstices of the bag and while not substantially deteriorating the increased vacuum efficiency provided by the bag.

What is claimed is:

1. A filter for separating suspended solid particulate matter comprising an intake means, a filter means and a discharge means, for passing the suspended solid particulate matter to the filter means and collecting the solid particulate matter on the filter means, said filter means comprising a non-woven needled textile filter fabric having at least 5,000 needle punches per square inch and constructed from a batt of staple textile fibers and said fabric having on an all-fiber basis:

(a) a face surface associated with the discharge means and a back surface associated with the intake means;

(b) an overall bulk density of at least 6 pounds per cubic foot;

(c) a bulk density gradient such that the bulk density at the face surface is at least 50% greater than the bulk density at the back surface;

(d) a filtering gradient such that the fineness of filtration at the face surface is greater than the fineness of filtration at the back surface;

(e) a gas permeability of at least 3 CFM per square foot at a pressure drop of 0.5 inch of water; and (f) a fineness of filtration such that the dynamic leakage is 7.0% or less.

2. The filter of claim 1 in the form of a bag house filter.

3. The filter of claim 1 in the form of an automobile air cleaner filter.

4. The filter of claim 1 wherein the bulk density gradient has the density generally increasing in a linearly and continuous manner from the back surface to the face surface.

5. The filler of claim 1 wherein the filter fabric has a dynamic face loading blindness of no greater than 5.0 inches of water pressure drop across the filter fabric and a filtered solid particulate matter recovery of at least 90%.

6. The filter of claim 1 wherein the filter fabric, on an all fiber basis, has an overall bulk density of at least 10 pounds per cubic foot.

7. The filter of claim 1 wherein the filter fabric, on an all fiber basis, has an overall bulk density of at least 15 pounds per cubic foot.

8. The filter of claim 1 wherein the bulk density at the face surface is at least 100% greater than the bulk of the back surface.

9. The filter of claim 1 wherein the bulk density at the face surface is at least 200% greater than the bulk of the back surface.

10. The filter of claim 1 wherein the filter fabric has a stitch strength of at least 50 pounds per inch of width.

11. The filter of claim 1 wherein the filter fabric has a polymeric filler therein and the overall bulk density of the filter fabric is at least 13 pounds per cubic foot.

12. The filter of claim 11 wherein the overall bulk density is at least 20 pounds per cubic foot.

13. The filter of claim 11 wherein the gas permeability of the filter fabric is at least 6 CFM per square foot.

14. The filter of claim 11 wherein the gas permeability is at least 12 CFM per square foot.

15. The filter of claim 11 wherein the filter fabric is substantially composed of staple polyester fibers and the filler is a combination of a polymer and inorganic solids.

16. The filter of claim 11 wherein there is an increasing filler density from the back surface to the face surface.

17. The filter of claim 1 wherein the gas permeability is at least 18 CFM per square foot.

18. The filter of claim 1 wherein the gas permeability is at least 12 CFM per square foot.

19. The filter of claim 1 wherein the gas permeability of the filter fabric is at least 6 CFM per square foot.

20. The filter of claim 1 having at least one reinforcing member on the face surface or the back surface.

21. The filter of claim 20 wherein the reinforcing member is a woven web or fabric.

22. The filter of claim 1 in the form of a bag with the intake means or a discharge means being provided by an aperture in the bag and the filter means being provided by a major portion of the walls of the bag.

23. The filter of claim 22 which is provided with a decorative surface on the bag.

24. The filter of claim 23 wherein the decorative surface is provided by a decorated fabric laminated to the bag.

25. The filter of claim 1 wherein the filter fabric, prior to needling, was composed of a batt of staple fibers.

26. The filter of claim 25 wherein the fibers are textile fibers.

27. The filter of claim 25 wherein the batt also has associated therewith a non-woven or woven previously prepared fabric or oriented yarns.

* * * * *